Jan. 7, 1958   F. DE BUIGNE   2,818,963
APPARATUS FOR HANDLING AND SHUTTLING PARTS
Filed Feb. 1, 1956   7 Sheets-Sheet 1
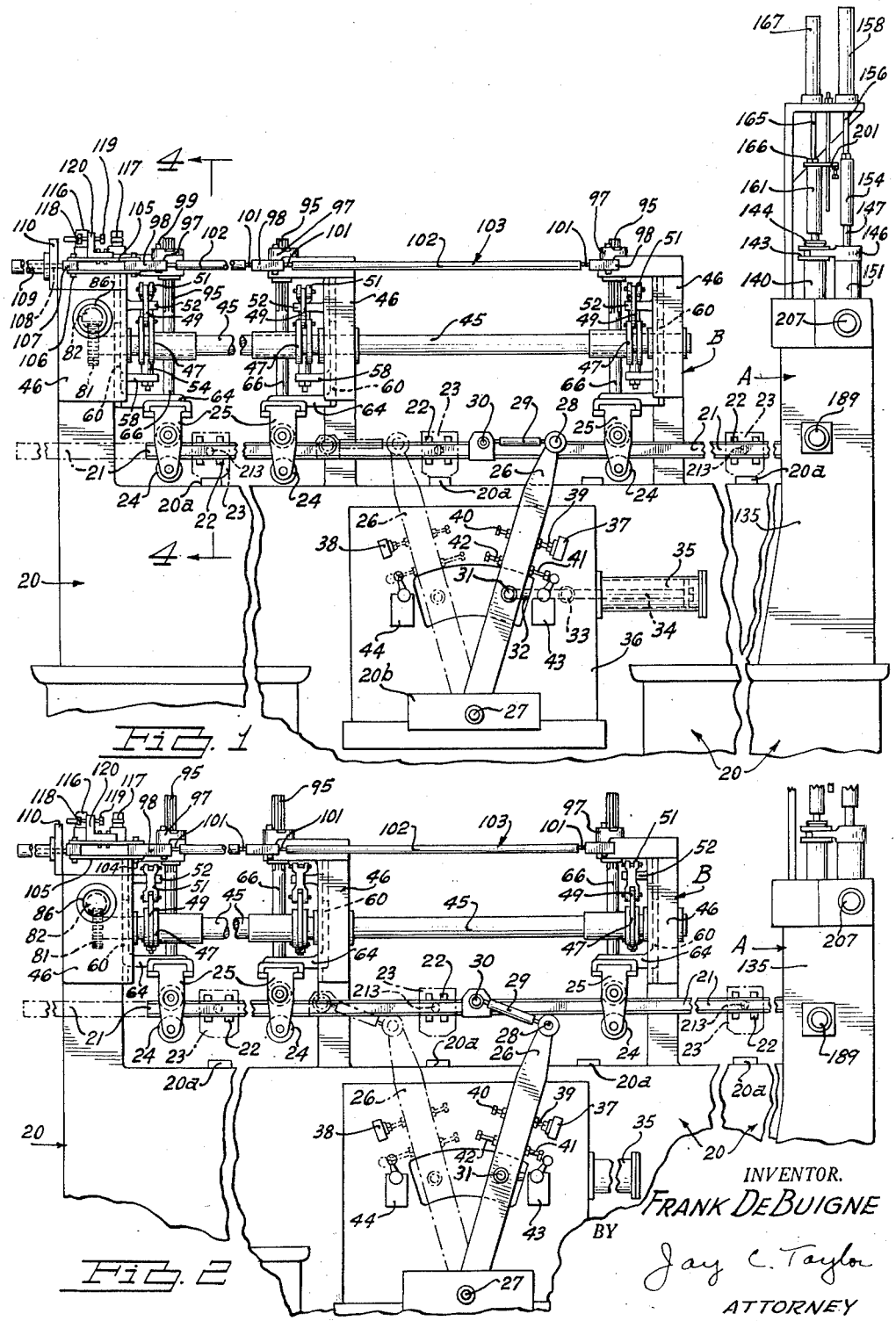
INVENTOR.
FRANK DE BUIGNE
BY
Jay C. Taylor
ATTORNEY Jan. 7, 1958    F. DE BUIGNE    2,818,963
APPARATUS FOR HANDLING AND SHUTTLING PARTS
Filed Feb. 1, 1956    7 Sheets-Sheet 2
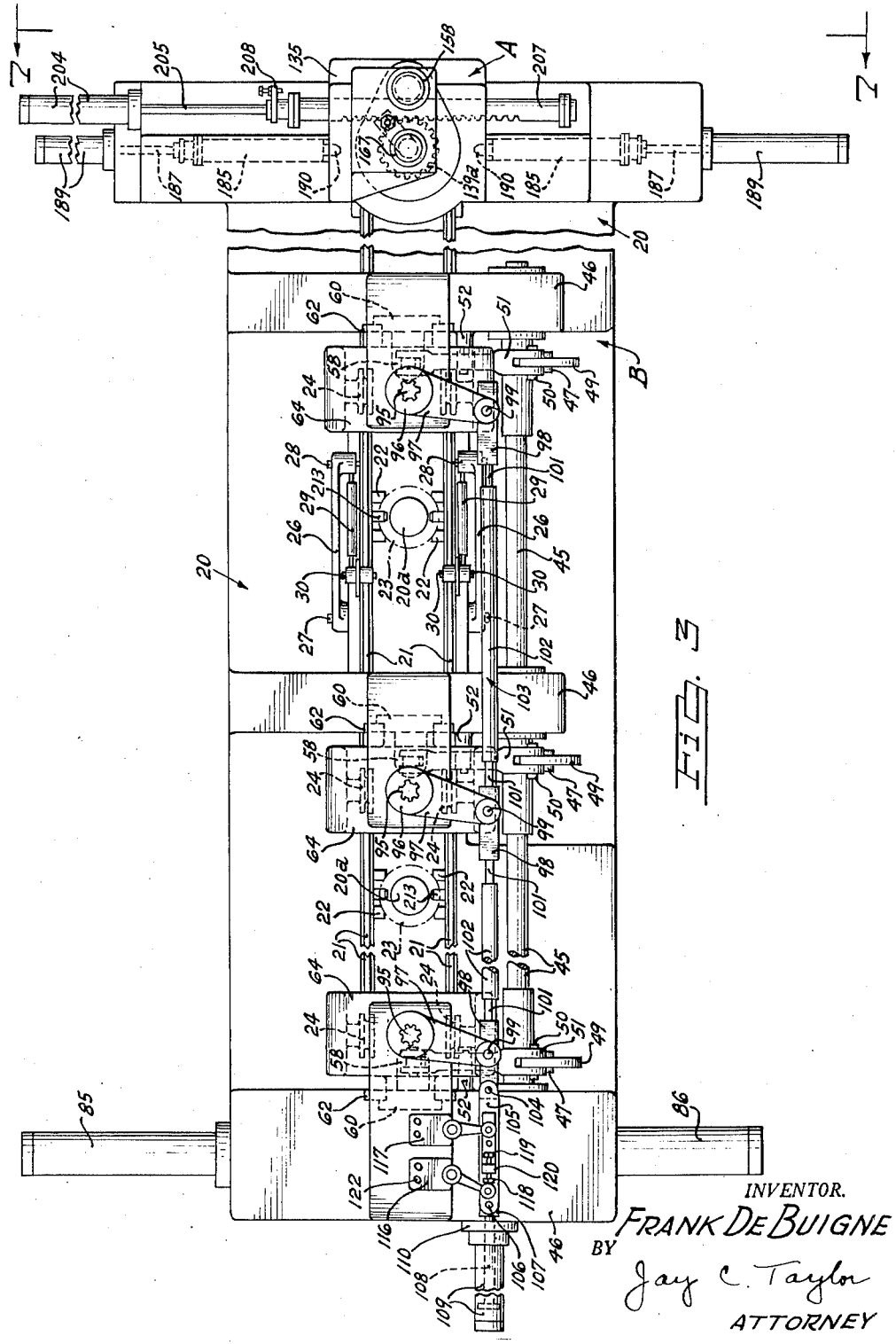
INVENTOR.
FRANK DE BUIGNE
BY Jay C. Taylor
ATTORNEY Jan. 7, 1958     F. DE BUIGNE     2,818,963
APPARATUS FOR HANDLING AND SHUTTLING PARTS
Filed Feb. 1, 1956     7 Sheets-Sheet 3

INVENTOR.
FRANK DE BUIGNE
BY Jay C. Taylor
ATTORNEY

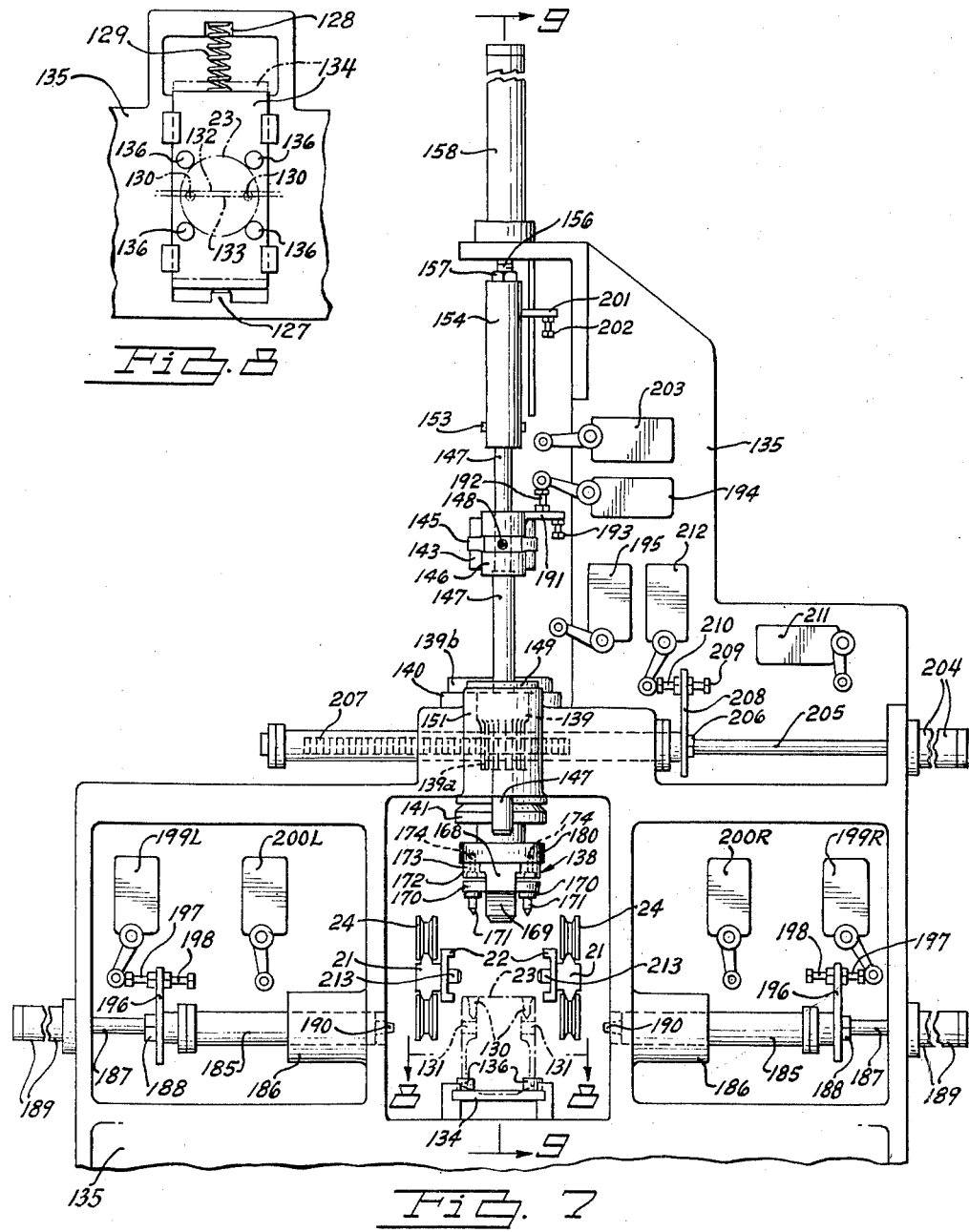

Jan. 7, 1958   F. DE BUIGNE   2,818,963
APPARATUS FOR HANDLING AND SHUTTLING PARTS
Filed Feb. 1, 1956   7 Sheets-Sheet 5
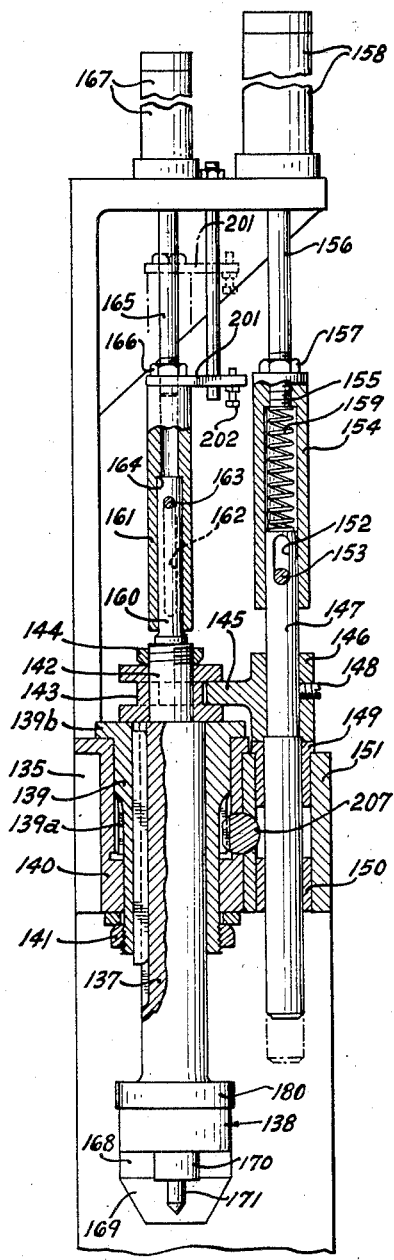
INVENTOR.
FRANK DE BUIGNE
BY
Jay C Taylor
ATTORNEY Jan. 7, 1958  F. DE BUIGNE  2,818,963
APPARATUS FOR HANDLING AND SHUTTLING PARTS
Filed Feb. 1, 1956  7 Sheets-Sheet 6

INVENTOR.
FRANK DE BUIGNE
BY Jay C. Taylor
ATTORNEY

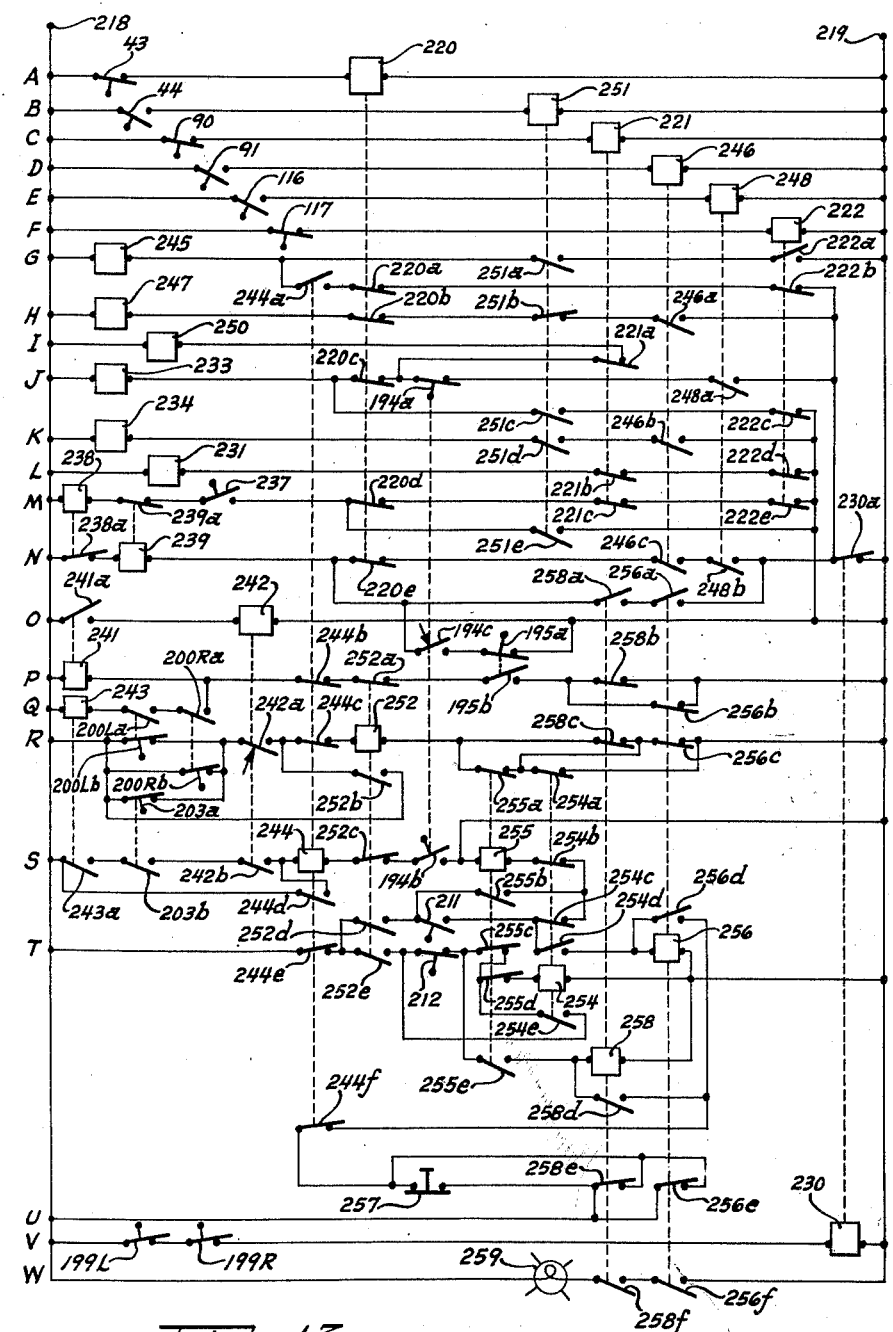

United States Patent Office 2,818,963
Patented Jan. 7, 1958

2,818,963

APPARATUS FOR HANDLING AND SHUTTLING PARTS

Frank De Buigne, Birmingham, Mich., assignor to La Salle Tool, Inc., Detroit, Mich., a corporation of Michigan Application February 1, 1956, Serial No. 562,865

16 Claims. (Cl. 198—19)

This invention relates to automatic material handling devices and in particular to a machine successively operative to index a piston for an internal combustion engine at a succession of work stations during the fabrication of the piston.

An important object of the present invention is to provide such a machine which is readily adaptable to be used universally with pistons or similar parts of different sizes.

Another object is to provide such a machine which automatically checks a piston when first placed thereon to assure that the piston is properly aligned with the shuttle mechanism prior to operation of the latter to index the piston to the first work station, and which either shifts an improperly aligned piston into proper alignment, or, if unable to do so, ceases the function to signal that fact.

Customary automobile pistons are provided with substantially diametrically opposed pin boss openings for the usual wrist-pin connection with the connecting rod. In some instances these pin-boss openings are offset slightly from the piston axis, so that proper alignment of a piston requires both translational and rotational positioning. Because of the slight offset of the pin-boss openings, a piston 180° out of rotational alignment cannot be fed through the work stations, although such a misalignment cannot be readily detected visually. It is accordingly another object of the invention to provide a machine of the foregoing character which automatically checks the piston for rotational alignment, then rotates the piston 180° if the latter is merely a half turn out of rotational alignment but is otherwise properly positioned.

Another object is to provide such a machine which maintains a piston placed thereon under positive control at all times, thereby to avoid accidental misalignment of the piston after it is placed on the machine, or while it is being indexed and shuttled from one work station to the next.

Other objects of this invention will appear in the following description and appended claims, reference being had to the accompanying drawings forming a part of this specification wherein like reference characters designate corresponding parts in the several views.

Fig. 1 is a fragmentary side elevational view of a mechanism embodying the present invention and adapted for handling pistons for automobile engines, the shuttle mechanism being illustrated in its lowered retracted piston-gripping position.

Fig. 2 is a view similar to Fig. 1, illustrating the shuttle mechanism in the raised retracted piston-gripping position.

Fig. 3 is a fragmentary enlarged plan view of the mechanism illustrated in Fig. 1.

Fig. 7 is a fragmentary end view taken in the direction of the arrows 7—7 of Fig. 3.

Fig. 8 is a fragmentary sectional view taken in the direction of the arrows 8—8 of Fig. 7.

Fig. 9 is a fragmentary enlarged vertical sectional view taken in the direction of the arrows substantially along the line 9—9 of Fig. 7.

Fig. 10 is an enlarged fragmentary view taken similarly to Fig. 9, showing enlarged details of the piston locating head.

Fig. 11 is a view similar to Fig. 10, but showing the position of the piston locating head as it would appear when engaged with a piston rotated 180° out of alignment.

Fig. 13 is a schematic view illustrating an electrical control circuit suitable for use with the structure of Figs. 1–11.

Figure 4:
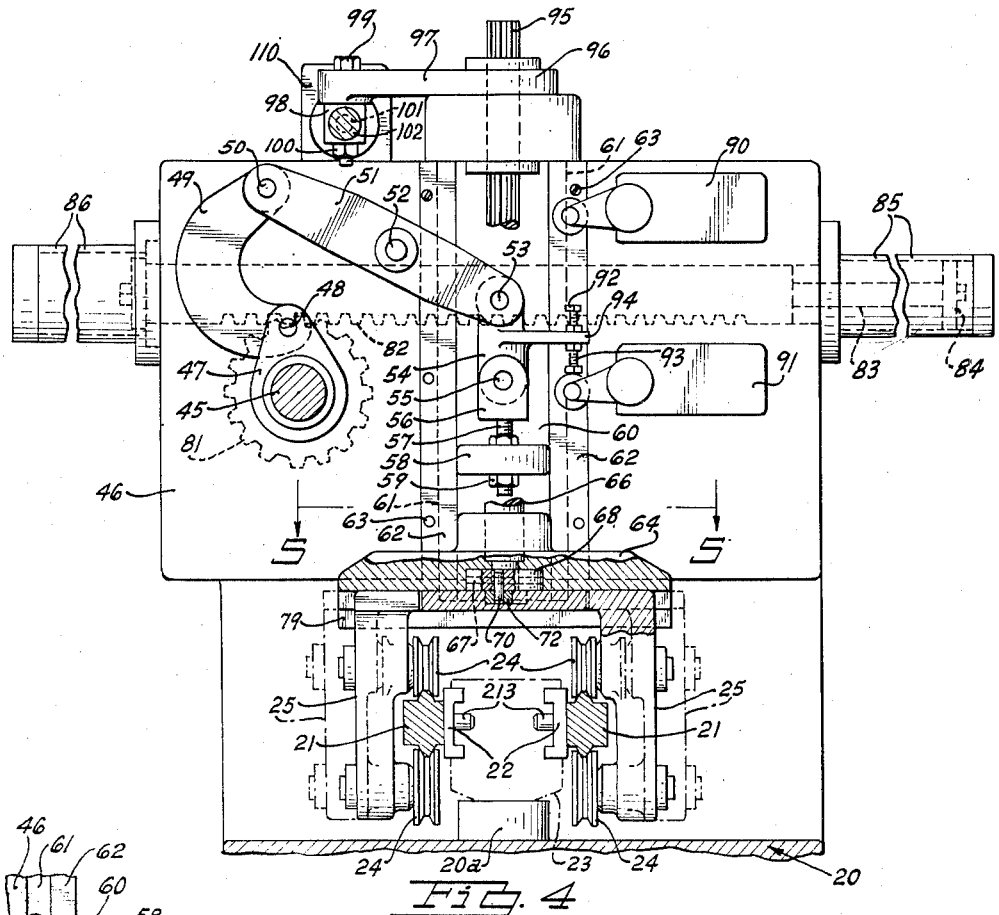
Fig. 4 is a fragmentary enlarged sectional view taken in the direction of the arrows substantially along the line 4—4 of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the mechanism comprises two primary parts, including a piston checking and aligning mechanism A and a piston indexing or shuttle mechanism B, Fig. 1. As described below, the piston is initially received by the mechanism A, checked and adjusted thereat for proper alignment with respect to the various work stations associated with the mechanism B. Throughout the checking and adjusting operations, the piston is maintained under the positive control of the mechanism to be described. Thereafter it is successively advanced or indexed by the shuttle mechanism to the various work stations spaced along the length of mechanism B, the several operations being synchronized by an electrical control system described below.

The mechanisms A and B are supported on a heavy frame or base indicated generally by the numeral 20. The shuttle mechanism comprises a pair of parallel transversely spaced horizontal rails or shuttle bars 21 extending longitudinally of the apparatus. Spaced longitudinally of the rails and carried thereby are a number of sets of grippers 22, Fig. 3, each set comprising two pairs of the grippers extending inwardly in opposition to each other from the two rails respectively in order to grip a cylindrical piston 23 therebetween as described below. The grippers are preferably of nylon or other suitable wear-resisting and comparatively non-abrasive material shaped at their inner ends to conform to the contour of the piston 23 so as to grip the latter's aluminum sidewalls without marring the same. Fig. 3 shows two pistons by way of example located at one of each of two work stations spaced longitudinally of the rails or shuttle bars 21, the piston at each station being gripped by the grippers 22, Fig. 4, in preparation to being shifted to the next successive station. As illustrated in Fig. 4, each rail comprises upper and lower V-shaped roller-engaging portions supporting a number of pairs of rollers 24 spaced longitudinally of the rails and journaled on a corresponding number of supporting brackets 25, so as to engage the corresponding rails from above and below.

Starting from the position illustrated in Figs. 1 and 4, a complete cycle of the shuttle operation comprises first raising the rails or bars 21 and the gripped pistons 23 in unison to the positions illustrated in Fig. 2, whereat the pistons are elevated from their respective supports 20a at the several work stations. The shuttle bars 21 are then shifted forwardly as indicated in phantom, Fig. 2, to carry each piston to a position immediately above the platform 20a at the next successive work station. Thereafter the rails 21 are lowered to the positions illustrated in phantom, Fig. 1, to deposit each piston at its new station. The rails are then spread laterally as illustrated in phantom, Fig. 4, to release the pistons from the grippers 22, whereupon the rails 21 in the laterally spread condition are again raised as illustrated in Fig. 2, then retracted or shifted rearwardly to the position illustrated in Fig. 2, except that in this instance the rails 21 are spread laterally by the amount illustrated in Fig. 4. Upon completion of the work operations at the several work stations, the rails 21 while in the laterally spread condition are again lowered as indicated in Fig. 1 and in the phantom view of Fig. 4, then moved inwardly toward each other to frictionally engage the grippers 23 with the pistons at the new stations preparatory to repeating the foregoing cycle.

In order to accomplish the foregoing shuttle movements, a pair of vertically and longitudinally swinging levers 26 are provided, one for each of the rails 21. The lower end of each lever 26 is pivoted at 27 on a bracket portion 20b of the frame 20. The upper end of each lever 26 is pivotally connected by means of a universal joint 28 to the rear end of a connecting rod 29 having a forward end pivotally connected by a universal joint 30 to the corresponding rail 21. A transverse tie-rod 31 connects the paired levers 26 for swinging in unison and is pivotally connected to the forward end of a connecting rod 32. The rear end of the latter is pivotally connected at 33 to the forward end of a hydraulically actuated plunger 34 of a horizontal hydraulic cylinder mounted on portion 36 of the frame 20. Upon actuation of cylinder 35 to reciprocate plunger 34, the levers 26 are likewise reciprocated in the directions of the rails 21 and the latter are advanced or retracted regardless whether they are in the raised or lowered condition of Figs. 1 and 2 respectively or the laterally spread or contracted positions illustrated in Fig. 4.

A pair of movement limiting bosses 37 and 38 are secured to and project laterally from the frame portion 36 so as to engage adjustable screw-threaded stops 39 and 40 respectively secured to the rearward and forward edges of one of the levers 26 to limit its swinging movement. Similarly a pair of adjustable screw-threaded limit switch contactors 41 and 42 are secured to the rearward and forward edges of the lever 26 to engage and trip the actuating arms of a pair of limit switches 43 and 44 arranged in the aforesaid electrical control system adjacent the retracted and advanced positions to effect automatic operation of cylinder 35 in synchronism with the vertical and lateral movements of the rails 21 as described below.

Figure 6:
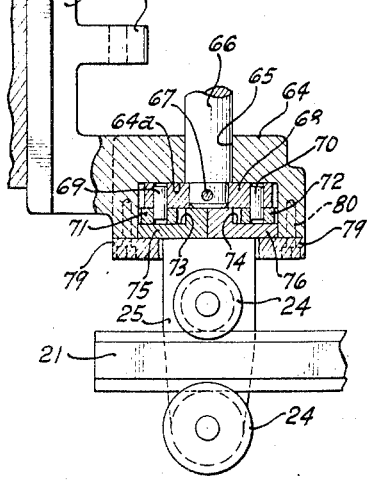
Fig. 6 is a fragmentary sectional view taken in the direction of the arrows substantially along the broken line 6—6 of Fig. 5.
Figure 5:
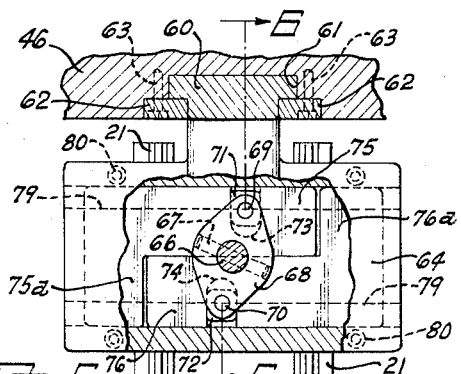
Fig. 5 is a fragmentary horizontal sectional view taken in the direction of the arrows substantially along the line 5—5 of Fig. 4.

Raising and lowering of the rails 21 in unison as aforesaid is accomplished by means of a horizontal longitudinally extending torsion rod 45 suitably supported by a number of rigid longitudinally spaced pillars 46 of the frame 20, Fig. 1. Referring to Fig. 4, a plurality of bell cranks 47 are keyed on rod 45 to pivot therewith, each crank 47 being associated with one of each of a pair of upper and lower rollers 24 and being pivotally connected at 48 to the lower end of a crescent-shaped crank arm 49. The upper end of the arm 49 is pivotally connected at 50 to the outer end of a transverse vertically swinging or rocking arm 51 which in turn is pivoted intermediate its ends at 52 on the pillar or frame portion 46. The inner end of each rocking arm 51 is pivoted at 53 to the upper end of a vertically reciprocable plunger or equalizer 54 having its lower end pivotally connected at 55 to a coupling 56. The lower end of the latter comprises a screw-threaded stud 57 adjustably secured to a bracket 58 by a pair of upper and lower retaining nuts 59. The bracket 58 is an integral horizontal extension of a vertically slidable carriage 60 mounted in a slideway 61 recessed into pillar 46, see Figs. 5 and 6, wherein Fig. 6 shows a fragmentary portion of the carriage 60 detached from coupling members 56 and 57. As illustrated in Fig. 5, the opposite lateral sides of the carriage 60 are overlapped by a pair of vertical retainers 62 recessed into the face of the pillar 46 and secured thereto by a plurality of screws 63.

A lower boss 64 integral with the carriage 60 is provided with a vertical bore 65 through which extends the lower end of a vertically shiftable spindle 66 having a reduced lower end keyed by a pin 67 to a horizontally pivotal operator 68. The latter is supported against the roof of a recess 64a in the under side of boss 64 and carries a pair of depending vertical pins 69 and 70 adjacent its opposite ends, Fig. 6. The lower ends of the pins 69 and 70 extend into sliding bushings or shoes 71 and 72 respectively immediately underlying the corresponding ends of the operator 68. The bushings 71 and 72 fit snugly within recesses 73 and 74 in the transverse extensions 75 and 76 integral with the upper ends of the aforesaid brackets 25, which support the rollers 24 and thereby support the rails or shuttle bars 21.

The extensions 75 and 76 extend horizontally in side-by-side sliding relation with each other and with the depending sidewalls of the recess 64a for movement transversely of the shuttle bars 21 upon horizontal swinging of the operator 68. The outer ends of the extensions 75 and 76 enlarge at 75a and 76a in the direction longitudinally of the shuttle bars so as to extend across the juxtaposed inner ends of the extensions 76 and 75 respectively and slidably engage the opposite walls of the recess or slideway 64a. Extending transversely of the rails 21 and underlying the forward and rearward edges of the transversely sliding extensions 75 and 76 are a pair of retainers 79 secured to the underside of the bracket 64 by screws 80. Thus the vertically shiftable carriage 60 carries the brackets 25, rollers 24, and shuttle bars 21 to enable raising and lowering as well as lateral spreading and contracting of the latter.

Upon counter-clockwise rotation of rod 45 approximately 90° from the position shown in Fig. 4, the crescent arm 49 will be shifted downwardly, causing counter-clockwise rocking of arm 51 and raising of the coupling system 54, 55, 57 and 58, whereby carriage 60 and rails 21 are raised to the position illustrated in Fig. 2. Upon reverse or clockwise pivoting of shaft 45 in Fig. 4, the reverse movement occurs and the rails 21 are lowered to the position illustrated in Fig. 1.

Pivoting of shaft 45 is accomplished by means of a pinion gear 81 suitably keyed on the forward end of the rod 45, Figs. 1 and 4, and meshed with a transversely shiftable gear rack 82. The right end of the latter in Fig. 4 is connected by means of plunger 83 with a hydraulically actuated piston 84 reciprocable in cylinder 85 suitably mounted on the foremost pillar 46. Extending in opposition to the cylinder 85 is a hollow housing 86 adapted to receive the left-end of the rack 82 upon its leftward shifting. Upon actuation of cylinder 85 to cause leftward shifting of piston 84 and rack 82, the pinion gear 81 is rotated counter-clockwise to raise the rails 21 as aforesaid. Upon the reverse actuation of cylinder 85, gear 81 is rotated clockwise to lower the rails.

Vertical movement of the rails 21 is synchronized with operation of other parts of the mechanism by the aforesaid electrical control system, including upper and lower limit switches 90 and 91 mounted on the most forward or leftward pillar 46 and having their operating elements arranged in the path of screw-threaded limit switch actuators 92 and 93 respectively adjustably screwed vertically into a bracket 94 connected with the plunger 54 to shift vertically therewith. Upon downward shifting of bracket 94, contactor 93 engages the actuator of limit switch 91 to indicate that the limit of downward movement has been reached.

Transverse spreading and contraction of the rails 21 is accomplished by rotation of spindles 66 keyed to their operators 68. As is apparent in Fig. 5, upon counterclockwise rotation of operator 68, the shoes 71 and 72 on pins 69 and 70 cause leftward shifting of extension 75 and rightward shifting of extension 76, thereby to spread the opposed brackets 25 and rails 21 to the phantom position illustrated in Fig. 4. Upon clockwise rotation of spindles 66, the reverse movement occurs and the brackets 25 and rails 21 are returned to the position illustrated in Fig. 4.

The upper end of each spindle 66 is splined at 95 and extends through the mating splined hub 96 of a swinging crank arm 97, Figs. 3 and 4. Each crank arm 97 is pivotally connected at its outer end to a link 98 by means of a bolt 99 and nut 100, the several links 98 being adjustably connected by means of reduced threaded portions 101 to adjacent rod portions 102 of a longitudinally shiftable tie-rod indicated generally by the numeral 103. At the left end of tie-rod 103 in Figs. 1 and 2, the link 98 is pivotally connected by a pin 104 to the right ends of a pair of equalizer links 105, the left ends of the latter links being pivotally connected by a pin 106 to a coupling 107 which in turn is connected to the outer end of hydraulically actuated plunger 108 reciprocable in hydraulic cylinder 109. The latter is suitably supported by bracket 110 of the foremost pillar 46. The screw-threaded couplings or connections 101 between the several links 98 and 102 enable longitudinal adjustment of the tie-rod 103 relative to the pivotal positions of the crank-arms 97 and spindles 66.

Actuation of cylinder 109 to shift plunger 108 and tie-rod 103 to the right in Fig. 3 will thus cause counterclockwise swinging of each crank arm 97 and spindle 66, thereby to cause lateral separation or spreading of the rails 21 and release of the pistons 23 from the grippers 22 as aforesaid. Actuation of cylinder 109 to retract plunger 108 will cause the reverse movement, rails 21 will move toward each other to the clamping position, and the pistons 23 at the various work stations will be gripped as aforesaid by the grippers 22.

Control of hydraulic cylinder 109 for shifting the tie-rod 103 in synchronism with operation of other parts of the mechanism is achieved by the aforesaid electrical circuit including limit switches 116 and 117 spaced longitudinally of the tie-rod 103 and having actuating arms adapted to be engaged and tripped by limit switch contactors 118 and 119 respectively adjustably screwed into bracket 120, which in turn is suitably secured to the top equalizer link 105. As illustrated in Fig. 3, the limit switches 116 and 117 are secured by screws 122 to the top of the leftward pillar 46. At the desired leftward movement of tie-rod 103, contactor 118 trips the actuator of limit switch 116 to signal that the limit of leftward movement has been reached. Similarly at the limit of rightward movement of tie-rod 103, contactor 119 engages the actuator of limit switch 117 to signal the end of the rightward movement.

The piston 23 comprising the workpiece in the present instance and illustrated in the inverted position in the drawings is of conventional construction and is formed with a pair of bottom locating holes 130, Figs. 7, 8 and 10, which opens downwardly (when the piston is in its normal operating position) at locations on a common diametrical plane 133 and spaced equidistant from the cylindrical axis of the piston 23. The latter is also formed with essentially diametrical pin boss openings or bushing holes 131 for the conventional wrist pin bushings. The holes 131 are centered on a plane 132 parallel to and offset slightly forwardly from the plane 133, Figs. 8 and 10.

In consequence of the piston structure, including the offset bushing holes 131, it is essential that each piston 23 be maintained in predetermined alignment with respect to the various work stations as it is shuttled from station to station. Each piston 23 is suitably located either mechanically or by hand at station A on a seat 134 slidably mounted on an upright frame portion 135 of the base 20 for sliding movement longitudinally of the rails 21, Fig. 8. When a piston 23 is properly located on the seat 134, the plane 132 will extend perpendicularly to the rails 21 at a location slightly forward of the plane 133. At this position, the locating holes 130 centered on the plane 133 will also be on the transverse diameter of the piston and the latter will be confined in position by tangential engagement with four upright cylindrical rollers 136 journaled on seat 134. Spring 129 under compression between a fixed retainer 128 of frame portion 135 and seat 134 normally urges the latter rearwardly against fixed stop 127 also of frame portion 135.

Inasmuch as the offset between the planes 132 and 133 is comparatively slight and not readily discernable by visual inspection, a piston 23 is occasionally located on the seat 134 approximately 180° out of annular adjustment. In such a position, the plane of the locating holes 130 will be the same as before, but the plane 132 will be rearward or to the right of the plane 133 in Fig. 10.

In order to check or verify that each piston 23 is properly located on the seat 134, as well as to shift the piston into proper location if it is slightly out of alignment, a vertically shiftable locator ram 137 is provided, Fig. 9, having a clamping and indexing head 138 at its lower end, Figs. 10 and 11. The ram 137 is slidably supported within the bore of a rotatable hub 139 journaled within a bushing 140 suitably mounted in the frame 137. The hub 139 is provided with an annular gear or toothed portion 139a and is also splined to the shaft 137 to rotate the latter. An upper flange 139b of the hub 139 overlies the bushing 140, the lower end of the hub 139 being threaded and retained by nut and washer assembly 141. An upper reduced extension 142 of the ram 137 carries an annular yoke 143 clamped tightly between the shoulder at the base of the reduced portion 142 by an upper nut 144.

A horizontal yoke 145 extending from a vertically shiftable hub 146 is confined between the upper and lower flanges of the yoke 143 to impart vertical movement thereto. Extending vertically through and keyed to hub 146 by a screw 148 is an actuating shaft 147. Below hub 146, the shaft 147 is slidable vertically through upper and lower bushings 149 and 150 supported in a bracket portion 151 of the frame 135.

In the upper end of the shaft 147 is a vertical lost motion slot 152 through which extends a vertically shiftable pin 153 having its opposite ends extending radially beyond shaft 147 and secured to the lower portion of a sleeve 154 telescoping over the upper end of the shaft 147. The upper end of sleeve 154 is internally threaded at 155 and secured to the lower threaded end of a plunger 156 and locked thereto in adjusted position by a nut 157. The upper end of plunger 156 is secured to a piston within a vertical hydraulic cylinder 158 supported on frame portion 135 and adapted to be actuated to raise and lower plunger 156. A coil spring 159 under compression between the lower end of plunger 156 and upper end of the shaft 147 normally urges the latter downwardly with respect to the sleeve 154, so that ordinarily the pin 153 is at the upper end of slot 152 except when indicating an improperly aligned piston at the station A as described below.

Slidably coaxially through the ram 137 is a check pin 160 having an upper end of reduced diameter extending slidably upwardly into an outer sleeve 161. The latter is provided with a movement limiting slot 162 for the outer ends of a pin 163 extending transversely through the upper end of check pin 160 and secured therein. Above the slot 162, the sleeve 161 is restricted to provide a shoulder 164 adapted to abut the upper end of pin 160 when moved downwardly thereagainst by means of a vertically shiftable hydraulically actuated plunger 165. The lower end of the latter is screwed into an upper internally threaded end of sleeve 161 and retained in adjusted position by a lock nut 166. The upper end of the plunger 165 is connected to a piston vertically reciprocal within a hydraulic cylinder 167 supported on frame portion 135 and operable to raise and lower plunger 165.

When a piston 23 is initially located on the seat 134, both cylinders 158 and 167 are actuated to hold plungers 156 and 165 in their upward or retracted positions, Fig. 7. Thereafter, cylinder 158 is actuated to move plunger 156 downwardly. By virtue of the tension in spring 159, plunger 147 and hub 146 are also moved downwardly as illustrated in Fig. 9. Accordingly ram 137 and head 138 are also moved downwardly by virtue of the interengaging yokes 143 and 145. The lower portion of the head 138 comprises a generally T-shaped slide 168 in end view, Fig. 7, having a lower tapered cam portion 169 adapted to extend into the skirt of the inverted piston 23, Fig. 10, upon lowering of the ram 137. By virtue of the tapered cam portion 169, if the piston 23 is not centered exactly on the seat 134, the piston will be cammed into proper position upon downward movement of the ram.

Suitably secured to the lower slide 168 and extending laterally therefrom in opposite directions are a pair of bosses 170, each carrying a depending locating pin 171 having a tapered lower end and adapted to extend into one of each of the locating holes 130 of the piston 23 when the latter is suitably aligned on the seat 134. By virtue of the taper of the pins 171 and of the openings 130, if the piston is slightly out of the desired rotational adjustment, the pins 171 will cam the piston exactly into adjustment as the ram 137 moves downwardly.

Underlying the lateral flanges comprising the upper cross-member of the T-shaped slide 168 are a pair of lateral supports 172 spaced from the upper portion of the head 138 by spacers 173 to prevent frictional binding of the slide 168. Screws 174 countersunk into the undersides of the supports 172 extend through the spacers 173 and screw into the lower end of the head 138, which lower end is integral with ram 137, Fig. 7.

Extending coaxially into the upper end of slide 168 is a socket 175 for a vertical bushing 176 having an outer shoulder seated on the slide 168. A bore 177 extending diametrically through a portion of the head 138 above the slide 168 contains a pair of opposed cup-shaped spring-urged centering plungers 178. The latter open outwardly and are urged radially inwardly by springs 179 under compression between the bases of the cup plungers 178 and an outer retainer 180 suitably secured to the head 138 above the slide 168. The upper end of the bushing 176 extends to the horizontal center line of the bore 177 and abuts a mating bushing 181 within the lower portion of the bore 182 of ram 137.

Upon the downward movement of ram 137 in accordance with downward movement of plunger 156, plunger 165 and sleeve 161 remain in the upper retracted position, phantom view, Fig. 9, so that pin 160 is at its upper position with pin 163 in the upper portion of slot 162. Also at this position, a movement limiting pin 184 extending radially through the sidewall of ram 137 projects into the lower portion of a lost motion space 183 between the upper and lower shoulders formed by a portion 160a of reduced diameter of the pin 160.

Although the piston 23 might be centered on the seat 134 with the locating holes 130 in the transverse vertical plane of the pins 171 to receive the latter, the piston 23 will occasionally be 180° out of rotational alignment as aforesaid, so that the plane 132 will be rearward rather than forward of the plane 133. In order to check for and to remedy such a situation, a pair of transversely shiftable horizontal rods 185 are supported in bushings 186 on the frame portion 135 at opposite sides of the seat 134 and are arranged to extend with their axes in the plane 132 of a piston properly located on the seat 134. The laterally outer end of each horizontal rod 185 is secured to a hydraulically actuated plunger 187 by a nut 188. The outer end of each plunger 187 is suitably secured to a piston reciprocable within a hydraulic cylinder 189 operable to shift its plunger 187 transversely toward and from the piston 23 located on seat 134.

The inner end of each rod 185 comprises a tapered check-pin or cam portion 190 adapted to seat within the bores of the bushing holes 131 and to cam the latter into exact coaxial alignment with the axis of the pins 185. If the piston 23 on the seat 134 is in proper rotational alignment, the tapered ends or check-pins 190 will project into the openings 131 without deflecting the piston 23. In the event however that the piston is 180° out of position, as the tapered ends 190 enter the openings 131, the misaligned piston 23 and sliding seat 134 will be shifted forwardly (to the left in Fig. 10) until the plane 132 is aligned with the axis of the pins 185. When the slide 168 is located within the skirt of the piston 23 and the pins 171 are within the openings 130, Fig. 10, forward shifting of the piston 23 will also shift the slide 168 forwardly to the position indicated in Fig. 11, thereby shifting bushing 176 out of coaxial alignment with bushing 181 and the vertical check pin 160. It is apparent that upon actuation of cylinder 167 to move plunger 165 downwardly, shoulder 164 will abut the upper end of pin 160 to urge the latter downwardly, but the lower end of pin 160 will abut the upper edge of bushing 176 to block the downward movement.

In order to synchronize the operation of the various hydraulically actuated plungers and check pins in the checking and aligning mechanisms as described, a number of limit switches provided in the aforesaid electrical circuit are actuated in accordance with the positions of the various pins or plungers as described below. Extending horizontally from the hub 146 and secured thereto is a bracket 191, Fig. 7, having upper and lower limit switch contactors 192 and 193 adjusted to engage the actuators of upper and lower limit switches 194 and 195 respectively. Thus when hub 146 is at its upper limit of movement, limit switch 194 is actuated to signal this condition. Similarly when hub 146 is at its lowermost position, limit switch 195 is actuated to signal this condition.

Secured to each of the rods 185 is a bracket 196 having outer and inner limit switch contactors 197 and 198 respectively adjusted to engage the actuators of outer and inner limit switches 199L and 200L (at the left in Fig. 7) and 199R and 200R (at the right in Fig. 7) in the aforesaid electrical circuit. Thus upon shifting of the horizontal check-pins 185, 190 to their outer limits of movement, the contactors 197 will trip the actuators of the limit switches 199L and 199R to signal this condition. Similarly upon movement of the horizontal check-pins 185, 190 to their inner limits of movement, the contactors 198 will trip the actuators of the limit switches 200L and 200R to signal this condition. Also secured to the upper end of sleeve 161 is a bracket 201 having a limit switch contactor 202 adjusted to shift the actuator of limit switch 203 in the aforesaid electrical circuit when plunger 165 is at its lowermost limit of movement, thereby to signal this condition.

In operation of the checking and aligning mechanism described thus far, a piston 23 is initially located on seat 134, at which time plungers 156 and 165 are retracted to their upper limits, plungers 187 are retracted laterally to their outer limits, and the shuttle bars 21 and grippers 22 are spread laterally from engagement with the piston 23. Hydraulic cylinder 158 is then actuated to shift plunger 156 and ram 137 downwardly as aforesaid. As hub 146 keyed to shaft 147 moves downwardly, contactor 192 rides off of limit switch 194 to signal that this movement has begun.

Upon downward movement of ram 137, the lower cam end 169 enters the skirt of the piston and cams the latter into exact centered position on seat 134. In the event that the piston 23 is so far out of rotational alignment that the tapered pins 171 cannot enter the tapered openings 130 and thereby cam the piston into proper alignment, the lower end of the pins 171 will engage the upper portion of the piston 23 to block continued downward movement of ram 137, whereby downward movement of the yoke 145, hub 146 and shaft 147 is also blocked and limit switch 195 is not actuated. Upon continued downward movement of sleeve 154, spring 159 will be compressed and pin 153 will be moved into the lower end of slot 152. After a predetermined time interval, a misaligned part is indicated and cylinder 158 is actuated to retract plunger 156 and ram 137. No further action will then take place until the position of the piston at seat 134 is adjusted and the foregoing cycle is re-started.

On the other hand, if the piston is located sufficiently accurately at the seat 134, so that upon downward movement of the head 138 the latter moves into the skirt of the piston and the pins 171 move into the openings 130, any slight misalignment of the piston will be adjusted as aforesaid by the camming action of the lower end 169 of the slide 168 and by the tapered pins 171 entering the tapered openings 130. In this situation, the ram 137 will move to its lowermost limit illustrated in Fig. 10 and limit switch contactor 193 will shift the actuator of limit switch 195 to signal that this downward limit of movement has been reached and to initiate operation of hydraulic cylinders 189 to cause horizontal inward movement of plungers 187.

Assuming now that the piston is in proper alignment with the plane 132 in advance of the plane 133, the tapered ends of the horizontal check-pins 190 will enter the bushing openings 131 without displacing the piston. In consequence the contactors 198 will engage the actuators of limit switches 200L and 200R at the limit of inward movement, and hydraulic cylinder 167 will be actuated to cause downward shifting of plunger 165 and sleeve 161. The engagement between the shoulder 164 and the upper end of the vertical check-pin 160 will move the latter downwardly to its lower limit of movement illustrated in Fig. 10, whereat the lower end of pin 160 will enter bushing 176. At this lower limit of movement, contactor 202 engages the actuator of limit switch 203 to signal that the piston is in proper alignment and to initiate the retraction of plungers 156, 165, and 187.

In the event however that the piston 23 at the seat 134 is 180° out of rotational alignment, the tapered ends of the horizontal check-pins 190 entering the openings 131 will cam the piston and slide 168 forwardly to the position shown in Fig. 11. At the limit of inward movement of check-pins 190, cylinder 167 will be actuated as aforesaid to move plunger 165 and vertical check-pin 160 downwardly as aforesaid. In this instance however the lower end of check-pin 160 will abut the upper end of bushing 176, which is now offset forwardly as illustrated in Fig. 11. Accordingly contactor 202 will not reach its lower limit of movement and engage the actuator of limit switch 203. After a suitable time delay in accordance with the electrical circuit, plunger 165 will be retracted to raise vertical check-pin 160, cylinders 189 will be actuated to retract the horizontal check-pins 190 from the piston, and hydraulic cylinder 204 will be actuated to rotate cam 137 and correspondingly head 138 and the piston 180° as described below.

Reciprocal horizontally in cylinder 204 is hydraulically actuated plunger 205 suitably connected by screw-threaded means including nut 206 with a horizontally shiftable gear rack 207 meshed with the teeth 139a of hub 139, Figs. 7 and 9. Also connected to plunger 205 and extending vertically therefrom is a bracket 208 having contactors 209 and 210 adjustably secured thereto so as to contact the actuators of limit switches 211 and 212 at the rightward and leftward limits of movement respectively of plunger 205, Fig. 7. The limit switches 211 and 212 are suitably supported on the frame portion 135. Rack 207 is cooperable with teeth 139a so that upon movement of plunger 205 from its limit in either direction to its limit in the opposite direction, hub 139 and ram 137 keyed thereto will be rotated through 180°. Accordingly, in the event that the vertical check-pin 160 fails to enter bushing 167 and thereby signals that the piston is 180° out of alignment, the subsequent operation of cylinder 204 will shift plunger 205 from one limit of movement to the other. It is apparent that the direction of movement is immaterial.

Figure 12:
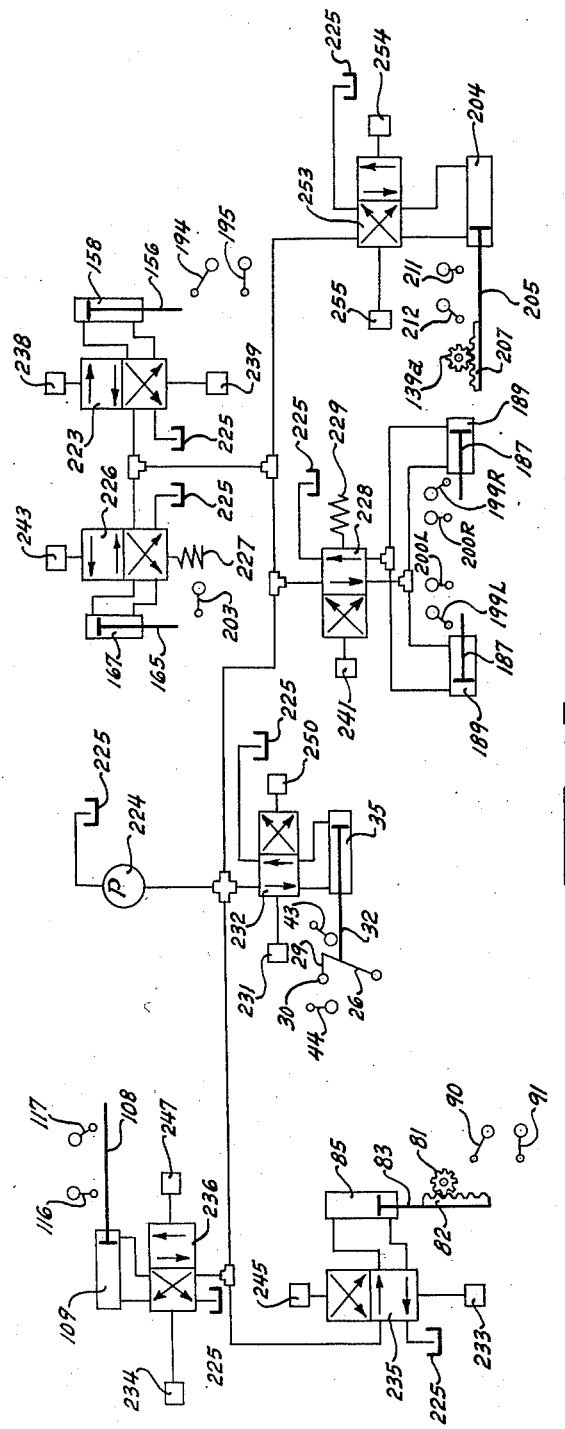
Fig. 12 is a schematic view illustrating a hydraulic circuit suitable for use with the structure of Figs. 1–11.

The sequence of operation of the above described mechanism is explained in reference to Figs. 12 and 13. The latter illustrates an electrical circuit diagram comprising a number of parallel circuits lettered A through W connecting the electrical power terminals 218 and 219. It is assumed that the apparatus is at the starting condition shown in the schematic diagram Fig. 12, the shuttle bars 21 being up, rearward, and spread apart to the unclamped position as illustrated in Figs. 2 and 7. Thus the shuttle mechanism is in position to be lowered to straddle and thereafter clamp a piston therebetween located at the seat 134, so as to transport that piston to the first work station in the mechanism B.

Normally open limit switches 43, 90 and 117 in circuits A, C and F are closed by virtue of the rearward, raised, and unclamped positions of the shuttle bars 21. Thus solenoids 220, 221 and 222 are energized, normally open relay switches 220a through 220e are closed, normally open relay switches 221a through 221c are closed, normally closed limit switch 222a is open, and normally open limit switches 222b through 222e are closed. Limit switch 43 opens when the shuttle leaves its rearward position. Limit switch 90 is adapted to open when the shuttle moves downward from its uppermost position. Limit switch 117 is adapted to open when the shuttle bars move inward from their outermost unclamped position. Also ram 137 is up so that normally open limit switch 194a in circuit J is closed and normally closed limit switches 194b and 194c in circuits S and N are open. These switches are controlled by limit switch actuator 194, so that upon movement of ram 137 from its upper position, switch 194a opens, switch 194b closes, and the closing of switch 194c, is initiated. As indicated by the arrow associated with switch 194c, the latter is slow to close, but opens with ordinary rapidity.

The ram 137 is maintained in the upper or starting position by slide valve 223 in Fig. 12 which connects the lower and upper ends of hydraulic cylinder 158 to the pressure of pump 224 and to sump 225 respectively, thereby holding the ram actuating plunger 156 in its upper position. Slide valve 223 is solenoidal actuated and is adapted until further actuated to remain in the position to which it is last shifted, even after its actuating solenoid is de-energized.

Check pin 160 is also up, so that normally closed limit switch 203a in circuit R is closed and normally open limit switch 203b in circuit S is open. These limit switches are operated by the actuator of limit switch 203 and reverse their positions upon downward movement of the vertical check pin 160 to its lowermost limit within the sleeve bushing 176. The vertical check pin 160 is controlled by slide valve 226 which is normally maintained in the position shown in Fig. 12 by spring 227, whereby the lower and upper ends of cylinder 167 are connected to pump 224 and to sump 225 respectively.

The horizontal check pins 190 are retracted at the starting position, so that the two normally open limit switches 199L and 199R in circuit V are closed. Thus solenoid 230 is energized and normally open relay switch 230a in circuit N is closed. These limit switches are adapted to open when the horizontal check pins 190 move inwardly or toward each other from their outermost limits. The horizontal check pins 190 are controlled by slide valve 228 which is normally urged to the leftward position shown in Fig. 12 by spring 229, whereby the inner and outer ends respectively of the cylinders 189 are connected to pump 224 and to sump 225 respectively.

Thus in the starting position, the shuttle-return solenoid 231 in circuit L is energized to hold slide valve 232 to the right in Fig. 12, connecting the left and right ends of cylinder 35 to pump 224 and sump 225 respectively. The shuttle-up solenoid 233 in circuit J and shuttle-unclamp solenoid 234 in circuit K are not energized, but their respective slide valves 235 and 236 are at the positions shown in Fig. 12, whereby the right and left ends of cylinder 85 in Fig. 4 (upper and lower ends in Fig. 12) are connected to pump 224 and sump 225 respectively, and the left and right ends of cylinder 109 are connected to pump 224 and to sump 225 respectively. In consequence the shuttle bars 21 are maintained at their uppermost and unclamped positions. The slide valves 232, 235 and 236, similarly to slide valve 223, are adapted to remain at rest in any set position until further actuated.

The cycle of operation is initiated by momentarily closing cycle start switch 237 in the ram-down circuit M. Switch 237 can either be manually actuated after a piston 23 is placed on the seat 134, or where automatic operation is desired, switch 237 can be operated as a limit switch and closed momentarily in synchronism with operation of the mechanism (not shown) for placing a piston 23 on the seat 134. In any event, upon momentarily closing cycle start switch 237, ram-down solenoid 238 in circuit M is energized through normally closed relay switch 239a and switches 220d, 221c, and 222e, whereupon normally closed limit switch 238a in the ram-up circuit N is opened and slide valve 223 is shifted downwardly to connect the upper and lower ends of cylinder 158 to pump 224 and sump 225 respectively. Ram 137 is thus driven downwardly. Inasmuch as ram-up solenoid 239 is not energized, the subsequent de-energizing of ram-down solenoid 238 upon the re-opening of cycle start switch 237 will have no effect upon the downward movement of the ram.

As ram 137 leaves its upper position, limit switch 194a in circuit J opens and 194b in circuit S closes. The closing of slow-to-close switch 194c is initiated and the latter will close after a predetermined time interval. In the event that the piston 23 at the seat 134 is mis-shaped or improperly aligned with respect to the locating pins 171, so that the latter cannot enter the locating holes 130 and move to its lowermost limit as in Fig. 10, after the aforesaid time interval required for slow-to-close limit switch 194c to close, the latter will close and energize ram-up solenoid 239 in circuit N, opening normally closed relay switch 239a and shifting slide valve 223 back to the position of Fig. 12. Ram 137 will then be retracted to its upper position and switches 194a, 194b and 194c will be reset as at the start of the cycle. The operator will then inspect the piston at the seat 134, will either re-align the piston or replace the same with another piston 23, and will again start the checking and aligning cycle by closing cycle start switch 237 as before.

If on the other hand, the piston 23 at the seat 134 is properly aligned to receive the pins 171 in the holes 130, the ram 137 on its downward movement after start of the checking and aligning cycle will move to its lowermost limit as in Fig. 10, whereupon normally closed limit switch 195a in the ram-up circuit N is opened before time delay limit switch 194c closes. Also normally open limit switch 195b in the horizontal check circuit P is closed, energizing solenoid 241 to close normally open relay switch 241a in circuit O and in consequence to energize time delay solenoid 242. Switches 195a and 195b are controlled by the actuator of limit switch 195, so that when ram 137 is at its lowermost position, switch 195a is open and switch 195b is closed. The energizing of solenoid 242 in circuit O closes normally open limit switch 242b in circuit S and initiates the closing of normally open time delay relay switch 242a in circuit R. As indicated by the arrow associated with switch 242a, the latter is slow to close, but opens with ordinary rapidity. Also the energizing of solenoid 241 moves slide valve 228 against the tension of spring 229 to connect the outer and inner ends of cylinders 189 to pump 224 and sump 225 respectively, thereby to start inward movement of the plungers 187 and their associated horizontal check pins 190. As plungers 187 move inwardly, limit switches 199L and 199R in circuit V open, de-energizing solenoid 230 and opening normally open limit switch 230a.

Assuming that the piston 23 is properly located on seat 134, the horizontal check pins 190 will enter the openings 131, closing normally open limit switches 200La and 200Ra in circuit Q and opening normally closed limit switches 200Lb and 200Rb in circuit R. Limit switches 200La and 200Lb are operated by the actuator of limit switch 200L. Similarly limit switches 200Ra and 200Rb are operated by the actuator of limit switch 200R. These limit switches are adapted to reverse their positions shown in Fig. 13, when the horizontal check pins are at their innermost positions within the piston, and to return to the positions shown in Fig. 13 upon retraction of the horizontal check pins from their innermost limits.

Closing limit switches 200La and 200Ra energize the vertical check solenoid 243 in circuit Q through limit switch 195b, which is now closed, and thereby closes normally open limit switch 243a in circuit S. Slide valve 226 is thus moved downwardly against the tension of spring 227 to connect the upper and lower ends of cylinder 167 to pump 224 and sump 225 respectively, thereby to move plunger 165 and vertical check pin down, as described above. Again assuming that the piston 23 is properly aligned rotationally at the seat 134, vertical check pin 160 will enter bushing 176 as aforesaid and engage the actuator of limit switch 203 at the lowermost limit of the vertical check pin movement, thereby to open normally closed limit switch 203a and close normally open limit switch 203b. Meanwhile slow-to-close time delay switch 242a will close after the lapse of sufficient time to permit the horizontal and vertical check pins to reach their limits of horizontal and downward movements respectively to indicate that the piston 23 is properly aligned at the seat 134.

In this instance it is assumed that the piston 23 is properly aligned, so that switches 200Lb, 200Rb, and 203a are all open and the closing of time delay switch 242a will have no effect in circuit R. However the closing of switches 243a and 203b will energize the shuttle cycle start solenoid 244 in circuit S, since switches 242b and 194b have been previously closed. In consequence, normally open relay switches 244a, 244d close and normally closed relay switches 244b, 244c, 244e and 244f open.

The closing of switch 244d energizes solenoid 244 after the subsequent opening of any of switches 243a, 203b, or 242b. The opening of switches 244c, 244e and 244f is a safety measure to prevent the subsequent energizing of circuits R, T, and U. Opening of switch 244b de-energizes the horizontal check solenoid 241, whereby normally open limit switch 241a opens and time delay solenoid 242 is de-energized to re-open switches 242a and 242b. The de-energizing of solenoid 241 also permits return of slide valve 228 to the retracted position shown in Fig. 12 and the horizontal check pins 190 are retracted. As the horizontal check pins move outwardly, limit switches 200La, 200Lb, 200Ra and 200Rb return to their positions shown in Fig. 13, thereby de-energizing the vertical check circuit Q to permit re-opening of switch 243a and the spring return of slide valve 226 to the upper position shown in Fig. 12, thereby to raise the vertical check pin 160. As the vertical check pin 160 moves up, switch 203a closes and switch 203b opens.

Upon completion of the withdrawal movement of horizontal check pins 190, limit switches 199L and 199R close to energize circuit V and close switch 230a, thereby to energize shuttle-down solenoid 245 in circuit G through closed switches 244a, 220a, 222b, and 230a. Slide valve 235 is thus shifted downwardly in Fig. 12 to connect the lower and upper ends of cylinder 85 respectively in Fig. 12 (i. e., the left and right ends in Fig. 4) with pump 224 and sump 225. As plunger 83 moves to the right in Fig. 4, shuttle bars 21 are lowered as described above, limit switch 90 in circuit C opens to de-energize solenoid 221 and reset relay switches 221a, 221b, 222c at their normally open positions. The opening of switches 221b and 221c has no effect on the rearward and downward positions of the shuttle and ram respectively because slide valves 232 and 223 remain in the positions to which they are shifted unless further actuated as explained above.

When the shuttle bars 21 reach their lowered positions, limit switch 91 in circuit D closes, energizing solenoid 246 and thereby closing normally open relay switches 246a, 246b and 246c. Shuttle clamp solenoid 247 in circuit H is energized through switches 220b, 251b, 246a and 230a, whereby slide valve 236 is shifted to the left in Fig. 12 to connect the right and left ends of cylinder 109 to pump 224 and sump 225 respectively and cause inward or clamping movement of the shuttle bars to grip the pistons 23 at seat 134 and at the various work stations in the mechanism B.

When plunger 108 leaves its rightward position shown in Fig. 12, normally open limit switch 117 in circuit F re-opens to de-energize solenoid 222 and reset switches 222a—222e at their positions shown in Fig. 13. At the leftward limit of movement of plunger 108, whereat the pistons 23 are clamped between the shuttle bars, normally open limit switch 116 in circuit E closes and solenoid 248 is energized to colse normally open relay switches 248a and 248b. Ram-up solenoid 239 in circuit N is thus energized through normally closed relay switch 238a, and normally open switches 220e, 246c, 248b and 230a, which are now closed. Cooperable with each pair of nylon grippers 22 is a projection 213 secured to and extending inwardly from the associated shuttle bar 21. The projections 213 are dimensioned and located so as to extend into and fit snugly within the pin boss openings 131 when the bars 21 are moved inwardly to their clamping position, Fig. 4, thereby to provide positive support for the gripped piston 23 during the shuttle movement.

Energizing ram-up solenoid 239 opens normally closed relay switch 239a and returns slide valve 223 to the position shown in Fig. 12, thereby to retract the ram 137 to its upper starting position. As ram 137 moves up, normally open limit switch 195b in circuit P opens and switch 195a in circuit N closes. At the upper limit of movement of ram 137, limit switches 194a, 194b and 194c are reset at their positions shown in Fig. 13, whereby shuttle cycle start solenoid 244 is deenergized, normally open relay switches 244a and 244d re-open and normally closed relay switches 244b, 244c, 244e and 244f close. Closing limit switch 194a energizes solenoid 233 in the shuttle-cup circuit J, causing slide valve 235 to shift to the position shown in Fig. 12 and raise the shuttle bars 21. Inasmuch as the latter are clamped against the pistons at seat 134 and the various work stations, these pistons are also raised with the shuttle bars.

By reason of the foregoing structure and sequence of operation, the piston 23 at seat 134 is maintained under constant control of the mechanism from the time it is checked by the vertical and horizontal check pins to the time that it is placed upon the first work station in mechanism B. Specifically, the piston is firmly held in position by the downward clamping action of the ram 137 throughout the checking operation and is thereafter gripped between the shuttle bars 21 before the ram is raised. Thus once the piston is properly aligned at the seat 134, it is maintained under the positive control of the mechanism and cannot be accidentally vibrated or jarred out of the desired alignment.

As the shuttle bars 21 are elevated, limit switch 91 in circuit D re-opens and solenoid 246 is deenergized, opening normally open relay switches 246a, 246b, and 246c. Thus the shuttle-clamp solenoid 247 and ram-up solenoid 239 are de-energized, although as explained above, the positions of the corresponding slide valves 236 and 223 remain unchanged. When the shuttle bars 21 reach their upper position, limit switch 90 in circuit C closes, energizing solenoid 221 and closing normally open limit switches 221a, 221b, and 221c. At this time, limit switches 222d and 222e are open, so that the shuttle-return circuit L and ram-down circuit M are not energized.

Closing relay switch 221a energizes the shuttle-forward solenoid 250 in circuit I, shifting slide valve 232 so as to connect the right and left ends of cylinder 35 to the pump 224 and sump 225 respectively and shift plunger 32 leftward in Fig. 12. In consequence the shuttle bars 21 are moved forward as explained above, limit switch 43 in circuit A opens, solenoid 220 is deenergized, and normally open switches 220a, 220b, 220c, 220d and 220e open. At the forward limit of movement of the shuttle bars 21, limit switch 44 in circuit B closes, energizing solenoid 251 and closing normally open relay switches 251a, 251c, 251d and 251e and opening normally closed relay switch 251b. The closing of switch 251a energizes the shuttle-down solenoid 245 in circuit G, causing downward movement of the shuttle as explained above, opening limit switch 90 in circuit C. In consequence solenoid 221 is de-energized and normally open relay switches 221a, 221b and 221c re-open.

When the shuttle reaches its downward position, each of the pistons 23 gripped thereby will have been shifted forwardly to the next successive work station, limit switch 91 in circuit D will close to energize solenoid 246, and normally open relay switches 246a, 246b, 246c will close. The closing of switch 246b energizes the shuttle-unclamp solenoid 234 in circuit K. Since the shuttle-clamp solenoid 247 is de-energized by virtue of open switch 220b, slide valve 236 is shifted to the position shown in Fig. 12. The left and right ends of cylinder 109 are connected to the pump 224 and sump 225 respectively to cause lateral spreading or unclamping movement of the shuttle bars 21 to release the pistons 23 at their respective work stations. The spreading or unclamping operation opens limit switch 116 in circuit E and closes limit switch 117 in circuit F, whereby solenoid 248 is de-energized and solenoid 222 is energized, normally open switches 248a, 248b open, normally closed switch 222a opens and normally open switches 222b, 222c, 222d and 222e close. The closing of switch 222c energizes the shuttle-up solenoid 233 in circuit J via switch 251c. Accordingly the shuttle bars 21 are raised, as explained above, leaving the several pistons 23 at their respective new work stations.

The apparatus is now reset to check and align a new piston 23 to be placed at seat 134, either manually or by suitable apparatus not shown, whereby the cycle start switch 237 is again momentarily closed as explained above to initiate the aforesaid piston checking and aligning cycle. As the shuttle bars 21 which are now at their forward unclamped positions start upwardly, limit switch 91 in circuit D opens, de-energizing solenoid 246 and opening switches 246a, 246b and 246c. When the shuttle bars reach their upper positions, limit switch 90 in circuit C closes, energizing solenoid 221, and closing switches 221a, 221b and 221c.

Closing of switch 221b energizes the shuttle-return solenoid 231 in circuit L via switch 222d, whereby slide valve 232 is shifted to the position shown in Fig. 12 to connect the left and right ends of cylinder 35 to pump 224 and sump 225 respectively. Plunger 32 then moves to the right in Figs. 1 and 12, the shuttle bars 21 are retracted or moved rearwardly, and limit switch 44 in circuit B opens to de-energize solenoid 251 and return switches 251a—251e to their positions shown in Fig. 13. At the rearward or retracted position of the shuttle bars, limit switch 43 closes, energizing solenoid 220 and re-setting switches 220a—220e at their positions shown as at the beginning of the cycle.

By virtue of closed switches 220d, 221c, and 222e, closing of cycle start switch 237 will initiate the piston checking and aligning cycle. Accordingly if desired, initiation of the latter cycle can be delayed until this stage of the shuttle cycle. The shuttle cycle is now complete and will not start again until shuttle cycle-start solenoid 244 in circuit S is energized as explained above.

It has been assumed in the preceding checking and the aligning cycle that the piston 23 was properly aligned at the seat 134. In the event that the piston is defective or misaligned so that either of the vertical or horizontal check pins can not reach their corresponding inward or downward limits of movement, the checking and aligning cycle will be modified as follows:

Assuming the same starting conditions as before, the ram-down solenoid 238 is energized by momentarily closing cycle start switch 237, whereupon ram 137 is moved downwardly as above explained. Thus limit switch 194a opens, limit switch 194b closed and the closing of slow-to-close time delay switch 194c is initiated. If the pins 171 properly enter the holes 130, limit switch 195a will open and switch 195b will close before time delay switch 146c closes. Thus the horizontal check solenoid 241 in circuit P will be energized to cause inward movement of the horizontal check pins 190 and to close switch 241a in circuit O, energizing time delay solenoid 242. Switch 242b is thus closed and the time delay closing of limit switch 242a is initiated. If as aforesaid the horizontal and vertical check pins reach their limits of inward and downward movement before time delay switch 242a closes, thereby to open all of the limit switches 200Lb, 200Rb and 203a in circuit R prior to closing of time delay switch 242a, a properly aligned piston will be indicated and the shuttle cycle will start by the energizing of solenoid 244 as above explained.

On the other hand, if any of the check pins 160 and 190 fails to move to its downward or inward limit of movement, then the corresponding limit switch 200Lb, 200Rb, or 203a will remain closed in circuit R to energize solenoid 252 upon the subsequent closing of time delay switch 242a. In consequence, normally closed relay switches 252a and 252c will open and normally open relay switches 252b, 252d, and 252e will close. Closing switch 252b holds solenoid 252 energized after the opening of switch 252a. Opening switch 252a de-energizes solenoid 241 in circuit P, re-opening switch 241a and permitting spring return of slide valve 228 to the position shown in Fig. 12, whereby the horizontal check pins are retracted and limit switches 200La and 200Ra re-open. The opening of switch 241a de-energizes solenoid 242 in circuit O to re-open switches 242a and 242b.

If the horizontal check pins had entered the pin boss openings 131 and had merely shifted the piston and ram head to the left as in Fig. 11, so that vertical check pin 160 could not enter sleeve 176, the piston 23 would merely be 180° out of rotational alignment at seat 134. The opening of limit switches 200La and 200Ra de-energizes vertical check circuit Q, causing spring return of slide valve 226 to the position shown in Fig. 12 and the upward return of the vertical check pin 160. Otherwise, if either of the horizontal check pins had failed to enter the corresponding pin boss opening 131, the corresponding switch 200La and 200Ra would remain open and the vertical check pin would not have been shifted downwardly.

The closing of relay switches 252d and 252e prepare circuit T for rotating the ram 180°. Depending upon the position of the ram rotating plunger 205, one of the limit switches 211, 212 will be open and the other closed. Assuming as illustrated that slide valve 253 is at the position shown in Fig. 12 connecting the right and left ends of cylinder 204 to pump 224 and sump 225 respectively, thereby holding plunger 205 to the left in Figs. 7 and 12, normally open limit switch 211 will be open and normally open limit switch 212 will be closed. Slide valve 253 is similar to slide valve 223 and will remain at rest at any position to which it is shifted until further actuated, even though the actuating solenoid is subsequently de-energized.

Solenoid 254 is energized through closed switches 244e, 252e, 212, 255c and 255d, causing normally closed relay switches 254a, 254b and 254c to open and normally open limit switches 254d and 254e to close. The closing of switch 254e holds solenoid 254 energized after the subsequent opening of limit switch 212. The energizing of solenoid 254 also causes leftward shifting of slide valve 253 in Fig. 12, connecting the left and right ends of cylinder 204 to the pressure and sump respectively and causing rightward shifting of plunger 204 in Figs. 7 and 12. In consequence ram 137 is rotated 180°, limit switch 211 is closed, and limit switch 212 is opened. If the piston 23 had merely been 180° out of rotational alignment, it will now be in proper alignment.

Limit switch 211 is now closed and limit switch 212 is now open. Solenoid 256 in circuit T is energized through switches 244e, 252d, 211, and 254d. The energizing of solenoid 256 closes normally open relay switches 256a, 256d, 256f, and opens normally closed relay switches, 256b, 256c, 256e. The opening of switch 256c de-energizes solenoid 252 in circuit R because normally closed switch 254a is also open at this time by virtue of energized solenoid 254. Closing of switch 256d holds solenoid 256 energized through the cycle reset switch 257 in circuit U after solenoid 254 is de-energized.

The de-energizing of solenoid 252 in circuit R closes normally closed switches 252a, 252c and opens normally open switches 252b, 252d, 252e. The closing of switch 252a energizes the horizontal check solenoid 241 in circuit P, which closes circuit O to energize solenoid 242, and starts the inward movement of the horizontal check pins 190. Open relay switch 252e de-energizes solenoid 254, closing switches 254a, 254b, 254c and opening switches 254d, 254e.

If the piston 23 at seat 134 is now properly aligned, the horizontal check pins 190 will enter the pin boss openings 131 without causing shifting of the piston and will also close limit switches 200La and 200Ra to energize the vertical check circuit Q. The vertical check pin 160 will thus move downward and, if the piston 23 is in proper alignment, limit switch 203b will close to energize shuttle start solenoid 244 in circuit S prior to the closing of slow-to-close time delay switch 242a. In the above regard, normally open switch 243a is closed by virtue of the energized solenoid 233 in circuit Q. Also switch 242b is closed by energized time delay solenoid 242 in circuit O. The energizing of solenoid 244 indicates that the piston is properly aligned, whereupon the check pins and ram are retracted and the shuttle cycle is initiated as described above to advance the piston 23 at seat 134 to the first work station in the mechanism B.

In the event, however that after piston 23 at seat 134 is rotated 180° and still does not permit proper entry of both the vertical and horizontal check pins, a damaged piston will be indicated. In such a case, one or the other of the limit switches 200Lb, 200Rb or 203a will not be opened before slow-to-close time delay switch 242a closes. Thus when the latter closes, solenoid 252 in circuit R will be energized to open switches 252a and 252c and to close switches 252b, 252d and 252e. Opening of switch 252a de-energizes the horizontal check circuit P to retract the horizontal check pins, whereby opening of limit switches 200L*a* and 200R*a* (provided that both of these had previously closed) will de-energize circuit Q and cause retraction of the vertical check pin to its upper position as explained above.

On retraction of the horizontal check pins, limit switches 199L and 199R will close to energize solenoid 230 in circuit V and to close relay switch 230*a*. Limit switches 200L*a* and 200L*b*, 200R*a* and 200R*b*, and 203*a* will now be at their positions shown in Fig. 13. Also the de-energizing of circuit P opens relay switch 241*a* in circuit O, de-energizing time delay solenoid 242 to re-open switches 242*a* and 242*b*.

At this stage, limit switch 211 is now closed, 212 is open, and solenoid 256 is still energized. Solenoid 254 is de-energized. Also solenoid 255 in circuit T is energized through switches 244*e*, 252*d*, 211, 254*c* and 254*b*. Energizing of the latter solenoid opens normally closed relay switches 255*a*, 255*c* and 255*d* and closes normally open switches 255*b*, 255*e*. Closed switch 255*b* holds solenoid 255 energized after switch 211 opens. Also energized solenoid 255 shifts slide valve 253 to the position shown in Fig. 12, thereby connecting the right and left ends of cylinder 204 to pressure and to the sump respectively and to cause shifting of plunger 204 to the left in Figs. 7 and 12, causing opening of limit switch 211 and closing of switch 212 as at the beginning of the cycle. Solenoid 258 is now energized through switches 244*e*, 252*e*, 212, and 255*e*.

The energized solenoid 258 closes normally open switches 258*a*, 258*d* and 258*f* and opens normally closed relay switch 258*b*, 258*c* and 258*e*. Closed switch 258*d* holds solenoid 258 energized via switches 257 and 244*f* after solenoid 252 is de-energized. Closed switch 258*a*, while 256*a* is closed, energizes ram-up solenoid 239 in circuit N. The latter solenoid opens switch 239*a* and returns ram 137 to its upper position shown, whereby limit switch 195*b* in circuit P opens, limit switch 194*a* closes, and switches 194*b* and 194*c* open. With limit switch 195*b* open, solenoid 241 in circuit P cannot be energized and the check pins cannot be actuated, so that the checking and aligning cycle is complete.

Opening switch 258*c* while switch 256*c* is open de-energizes time delay solenoid 252 in circuit R, whereby switches 252*a*, 252*c* close and switches 252*b*, 252*d*, and 252*e* open. Opening of switches 252*d* and 252*e* de-energize solenoid 255, closing switches 255*a*, 255*c*, 255*d* and opening switches 255*b*, 255*e*. Closing switch 258*f* while switch 256*f* is closed energizes a suitable signal, such as a light 259 in circuit W, to notify the machine operator that a bad part or piston must be removed from the seat 134.

After removal of the bad part and its replacement by new piston at the seat 134, cycle reset switch 257 is opened to de-energize solenoids 256 and 258 and to reset normally open switches 256*a*, 256*d*, 256*f*, 258*a*, 258*d*, 258*f* and normally closed switches 256*b*, 256*c*, 256*e*, 258*b*, 258*c*, and 258*e* as at the start of the checking and aligning cycle. Thereafter cycle start switch 237 in the ram-down circuit M is momentarily closed to initiate a new checking and aligning cycle to operate on the new piston at the seat 134.

I claim:

1. In a device for shuttling a workpiece along a row of progressive work stations, a pair of parallel shuttle bars adapted to extend at a lowered position along said row in position straddling said workpiece, means on said bars at each station for gripping a workpiece therebetween when said bars are moved toward each other from an unclamping to a clamping position, supporting means for said bars, the latter being shiftable longitudinally with respect to said supporting means and being interengaged therewith to shift laterally and vertically, therewith, reciprocating means cooperable with said supporting means to reciprocate the same and said bars transversely to and from the clamping and unclamping positions, second reciprocating means engaging said bars to reciprocate the same longitudinally to and from advanced and retracted positions, third reciprocating means cooperable with said supporting means to reciprocate the same and said bars vertically to and from said lowered position and a raised position above said row, and control means cooperating with said reciprocating means for selectively reciprocating the same in a predetermined cycle of movements.

2. The combination according to claim 1 wherein said control means is effective to move said shuttle bars from their unclamping, retracted, and raised position, sequentially downwardly to said lowered position to straddle said workpiece, toward each other to the clamping position, vertically to the raised position, longitudinally to the advanced position, downwardly to the lowered position, transversely to the unclamping position, vertically to the raised position, and thence longitudinally to the retracted position as at the beginning.

3. The combination according to claim 1 and comprising in addition means connecting said shuttle bars for reciprocation in unison, the first named reciprocating means comprising a member shiftable generally longitudinally of said bars, a connecting rod universally connected at its opposite ends to said member and to one of said bars, thereby to reciprocate the latter longitudinally upon reciprocation of said member when said bars are at any of their clamping, unclamping, raised, or lowered positions.

4. In a device for shuttling a workpiece along a row of progressive work stations, a pair of parallel shuttle bars adapted to extend at a lowered position along said row in position straddling said workpiece, means on said bars at each station for gripping a workpiece therebetween when said bars are moved toward each other from an unclamping to a clamping position, a pair of laterally and vertically reciprocable bracket means supporting said bars, said bars being shiftable longitudinally with respect to said bracket means and being interengaged with the latter to be reciprocated vertically therewith and also to be shifted to and from the clamping and unclamping positions upon lateral reciprocation of said bracket means, reciprocable means engaging said bracket means to shift the same and bars to and from said lowered position and a raised position above said workpiece, longitudinally reciprocable means engaging said bars to shift the same to and from advanced and retracted positions, a separate power actuated means associated with said pair of bracket means and said vertically and longitudinally reciprocable means to reciprocate the same, and control means cooperable with said power actuated means to cause reciprocation thereof in a predetermined cycle of movements.

5. The combination according to claim 4 wherein each bracket means has a transverse projection extending in side-by-side relation with the projection of the other support, and the power actuated means associated with said bracket means comprises a horizontally swinging lever, a rotatable shaft slidable vertically with respect to said lever and splined thereto, and means connecting said shaft and each projection to reciprocate the same transversely and oppositely to the other upon swinging of said lever to rotate said shaft.

6. In combination with a pair of parallel shuttle bars adapted to extend longitudinally of a row of workpieces located at progressive work stations, said shuttle bars straddling said row and having means at each station for clamping a workpiece therebetween when said bars are moved transversely toward each other from an unclamping to a clamping position, means for supporting and shifting said shuttle bars comprising a frame, a vertical slide on said frame, a carriage slidable vertically along said slide, power actuated means for reciprocating said carriage, a pair of bracket means mounted on said carriage to reciprocate laterally with respect thereto, and each supporting one of each of said bars, each bar being shiftable longitudinally with respect to its supporting means and being interengaged therewith to shift laterally and vertically therewith, a vertical rotatable spline shaft mounted on said carriage to reciprocate vertically therewith, means connecting said shaft with each bracket means to reciprocate the same transversely and oppositely to the other upon rotation of said shaft, power actuated means to oscillate said shaft, and power actuated means for reciprocating said bars longitudinally.

7. The combination according to claim 6 wherein said power actuated means for reciprocating said bars comprises a member reciprocable generally longitudinally of said bars, a connecting rod universally connected at opposite ends to said member and to one of said bars, and means connecting said bars for reciprocation longitudinally in unison.

8. The combination according to claim 6 wherein each bracket means has an extension projecting toward the other bracket means and slidably supported by said carriage, and said means connecting said shaft with each extension comprises an operator keyed to said spline shaft to oscillate therewith and having opposite ends engaging said extensions respectively.

9. In a device for handling workpieces adapted to be shuttled along a series of work stations, a seat adapted to support the workpiece thereon, a vertically reciprocable ram overlying said seat and movable downwardly to clamp said workpiece against said seat, said ram having a projection adapted to enter a vertical recess in said workpiece and thereby to move to a predetermined limit of downward movement when said workpiece is located on said seat with said recess aligned with said projection, power actuated means for reciprocating said ram, and control means cooperable with said power actuated means to cause upward movement of said ram upon failure of said projection to move to said limit within a predetermined time interval.

10. The combination according to claim 9 and comprising in addition horizontally reciprocable check means adapted to enter a lateral recess in said workpiece to a predetermined limit of inward movement when said workpiece is located on said seat with said lateral recess aligned with the check means, second power actuated means for reciprocating said check means, said control means being also cooperable with said second power actuated means to cause inward movement of said check means upon movement of said projection to said downward limit and to cause outward movement of said check means and upward movement of said ram upon failure of said check means to move to said limit of inward movement within a predetermined time interval.

11. The combination according to claim 10 and comprising in addition a cam portion on said horizontally reciprocable check means adapted to enter said lateral recess and engage its sidewalls when said workpiece is located on said seat with said lateral recess offset from a position of alignment with said check means and to shift said workpiece into a position whereat said lateral recess is aligned with said check means, said projection being shiftably mounted on said ram to shift with said workpiece, means yieldingly urging said projection to a rest position with respect to said ram, vertically reciprocable check means, a third power actuated means for moving said vertically reciprocable check means to a predetermined limit of downward movement, stop means shiftable with said projection and into the path of downward movement of said vertically reciprocable check means when said projection is shifted from its rest position, thereby to block movement of said vertically reciprocable check means to its downward limit of movement, and said control means being cooperable with said power actuated means to cause downward movement of said vertically reciprocable check means upon inward movement of said horizontally reciprocable check means to said inward limit of movement and to cause outward movement of the latter check means and upward movement of said ram and vertically reciprocable check means upon movement of the latter check means to its aforesaid downward limit.

12. The combination according to claim 11 and comprising in addition power actuated means for rotating said ram a predetermined increment of rotational movement, said control means being cooperable with said power actuated means to cause outward movement of said horizontally reciprocable check means and upward movement of said vertically reciprocable check means, upon failure of the latter to move to its aforesaid downward limit, and thereafter to cause said predetermined movement of rotational movement of said ram.

13. In a device for handling a workpiece adapted to be shuttled along a series of work stations, a seat adapted to support the workpiece thereon, reciprocable check means adapted to move into and out of a recess in said workpiece when the latter is located on said seat with said recess at substantially a predetermined location and having a cam engageable with the edges of said recess to shift the latter into said location, means engageable with said workpiece to indicate the position thereof with respect to said check means, and means for rotating said workpiece a predetermined amount when said workpiece is at a predetermined position with respect to said check means.

14. The combination according to claim 13 wherein said means engageable with said workpiece comprises a portion movable with said workpiece and also comprises a shiftable check means engageable at one position with said portion when the workpiece is at one position with respect to the first named check means and being engageable at another position with said portion when the workpiece is at another position with respect to said first named check means.

15. The combination according to claim 13 wherein said means engageable with said workpiece comprises a ram movable to and from a position adjacent the workpiece on said seat and having a slide portion adapted to interengage with said workpiece to move therewith when said ram is adjacent said workpiece, and shiftable check means engageable at one position with said slide portion when the workpiece is at one position with respect to the first named check means and being engageable at another position with said slide portion when the workpiece is at another position with respect to said first named check means.

16. The combination according to claim 13 wherein said seat comprises a shiftable portion interengageable with the workpiece to move therewith and wherein said means engageable with said workpiece comprises a ram movable to and from a clamping position for clamping said workpiece against said shiftable portion, said ram having a slide portion interengageable with said workpiece to move therewith when said ram is at said clamping position, and shiftable check means engageable at one position with said slide portion when the workpiece is at one position with respect to the first named check means and being engageable at another position with said slide portion when the workpiece is at another position with respect to said first named check means.

References Cited in the file of this patent

UNITED STATES PATENTS 2,193,840    Oberhoffken et al. _____ Mar. 19, 1940